United States Patent [19]
Fletcher et al.

[11] 3,723,745
[45] Mar. 27, 1973

[54] RADIANT SOURCE TRACKER INDEPENDENT OF NON-CONSTANT IRRADIANCE

[76] Inventors: James C. Fletcher, Administrator of the National Aeronautics and Space Administration in respect to the invention of; Fred D. Campbell, Los Angeles, Calif.

[22] Filed: Dec. 28, 1971

[21] Appl. No.: 212,900

[52] U.S. Cl............250/203 R, 250/83.3 H, 250/214, 356/152
[51] Int. Cl.................................................G01j 1/20
[58] Field of Search.250/202, 203, 220, 214, 83.3 H; 356/141, 152, 138, 172

[56] References Cited

UNITED STATES PATENTS

| | | | |
|---|---|---|---|
| 3,479,604 | 11/1969 | Abernathy | 328/147 |
| 3,671,748 | 6/1972 | Friedman | 250/203 |
| 3,418,478 | 12/1968 | Falbel | 250/203 |
| 3,521,071 | 7/1970 | Speller | 250/203 |

Primary Examiner—James W. Lawrence
Assistant Examiner—D. C. Nelms
Attorney—John R. Manning et al.

[57] ABSTRACT

A tracker of a radiant source is disclosed, comprising a sectored matrix of detectors whose output voltages correspond to their respective levels of irradiance. The voltages are each sampled during a variable length period and the resulting samples are shaped into triangular samples by an integration process. They are supplied to a demodulator which provides an output corresponding to the difference of the time-voltage product of appropriate combinations of the samples. This output after filtering represents the angle of incidence on the detectors with respect to a central axis. The triangular samples are also supplied to a demodulator whose output is an AGC voltage which is a function of the sum of the time-voltage integrals of the triangular samples. This AGC voltage is supplied to a pulse width modulator whose output controls the period of the voltage sample which is taken from each detector.

15 Claims, 7 Drawing Figures

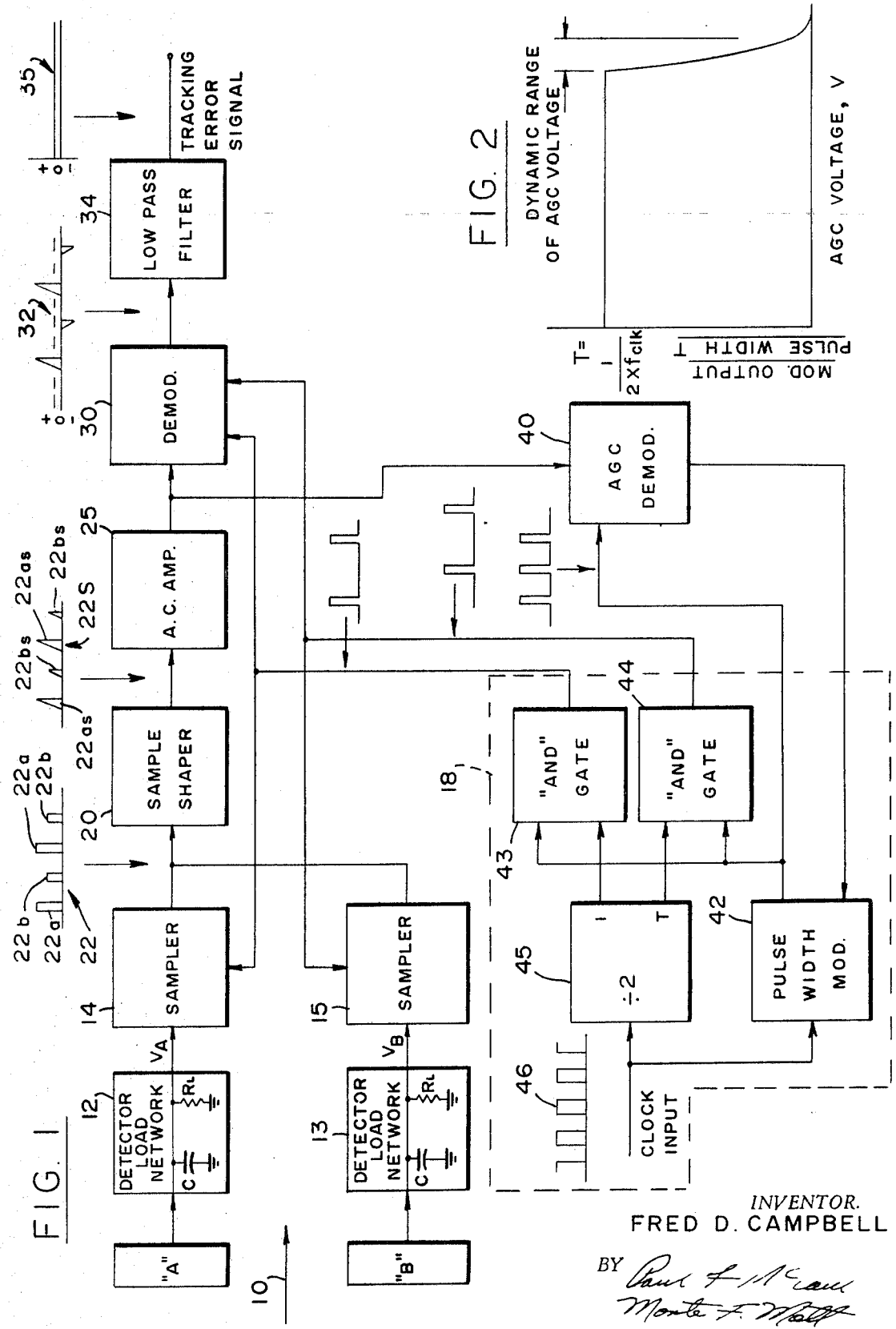

FRED D. CAMPBELL
*INVENTOR.*

FRED D. CAMPBELL
*INVENTOR.*

BY
ATTORNEYS

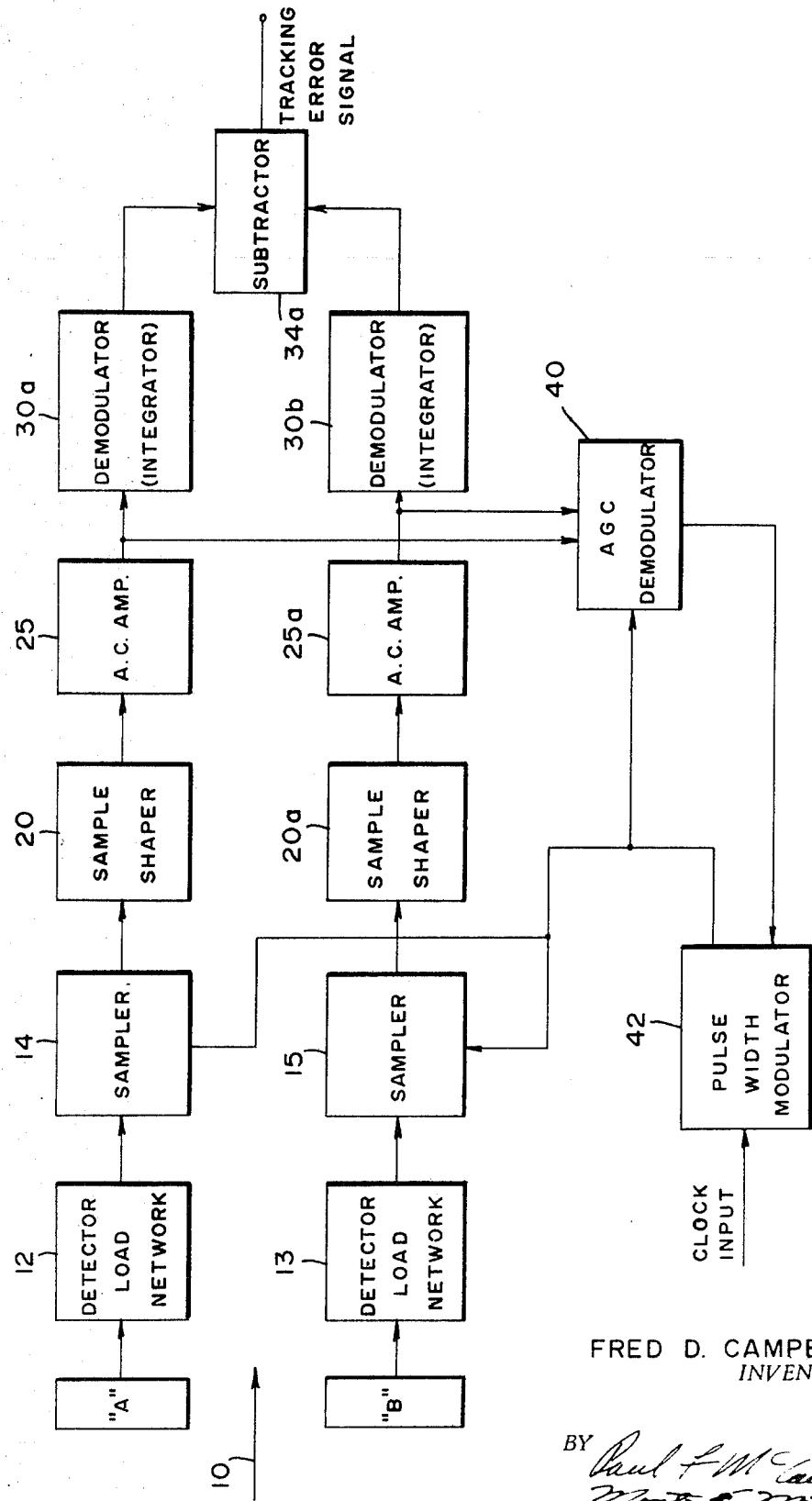

RADIANT SOURCE TRACKER INDEPENDENT OF NON-CONSTANT IRRADIANCE

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention is generally directed to a radiant source tracker and, more particularly, to a tracker which tracks a source of non-constant radiance.

2. Description of the Prior Art

As used herein a tracker is assumed to define a device which develops an output signal which is a function of the angle between the device's axis and the line-of-sight to a source of radiance, which is in the device's field of view. A common problem associated with prior art trackers, falling in this generic class, lies in the normalization of the transfer function of the signal for a range of irradiance levels into its aperture. Briefly, it is desired that the output tracking error signal be a function only of angular tracking error. However, as is known by those familiar with the art, this is not the case in prior art trackers. Therein, the change of the output tracking error signal as a function of change in angular tracking error is greatly dependent on the radiance level of the source, which is a marked disadvantage, particularly if the level changes are not known. Also most prior art trackers employ mechanical moving parts or electronic or mechanical scanning techniques which increase the trackers' complexities, sizes and costs. Thus, a need exists for a tracker which provides an output tracking error signal, which is independent of the level of the radiance from the source which is tracked, and which is not limited by other disadvantages of prior art devices.

OBJECTS AND SUMMARY OF THE INVENTION

It is a primary object of the present invention to provide a new improved tracker of a source of radiance.

Another object of the present invention is to provide a new tracker which provides a tracking error signal which is dependent only on angular tracking error.

A further object of the present invention is the provision of a tracker of a source of non-constant radiance.

Yet another object of the present invention is to provide a tracker which does not employ mechanically moving parts.

Still another object of the present invention is to provide a tracker which does not employ electronic or mechanical scanning of either the source or the field of view.

A further object of the present invention is to provide a tracker which can track sources which have a widely varying angular subtense when viewed from the tracker.

Yet a further object of the present invention is to provide a tracker which can track in two-axes simultaneously.

These and other objects of the present invention are achieved by providing a tracker with a matrix of detectors. The radiant flux from the source to be tracked is imaged onto the detectors. The spatial extent of the radiant flux is such that some energy falls on each of the detectors when the source is in the tracker's linear field of view. The outputs of each of the detectors are sampled during equal duration time periods. These can be successive in time or simultaneous. The tracker includes means which derives the difference between appropriate combinations of samples from the detectors to obtain the tracking error signal with respect to one or more central axes. The samples are also averaged to provide an automatic gain control (AGC) signal which is used to adjust the duration of the sampling period, thereby making the tracking error signal independent of radiance level changes.

The novel features of the invention are set forth with particularity in the appended claims. The invention will best be understood from the following description when read in conjunction with the accompanying drawings.

BRIEF DESCRIPTION OF THE DRAWINGS

FIG. 1 is a block diagram of the present invention for tracking about a single axis;

FIG. 2 is a diagram illustrating the characteristics of the AGC demodulator, shown in FIG. 1;

FIG. 5 is a block diagram of another embodiment of the tracker;

DESCRIPTION OF THE PREFERRED EMBODIMENTS

Figure 3:
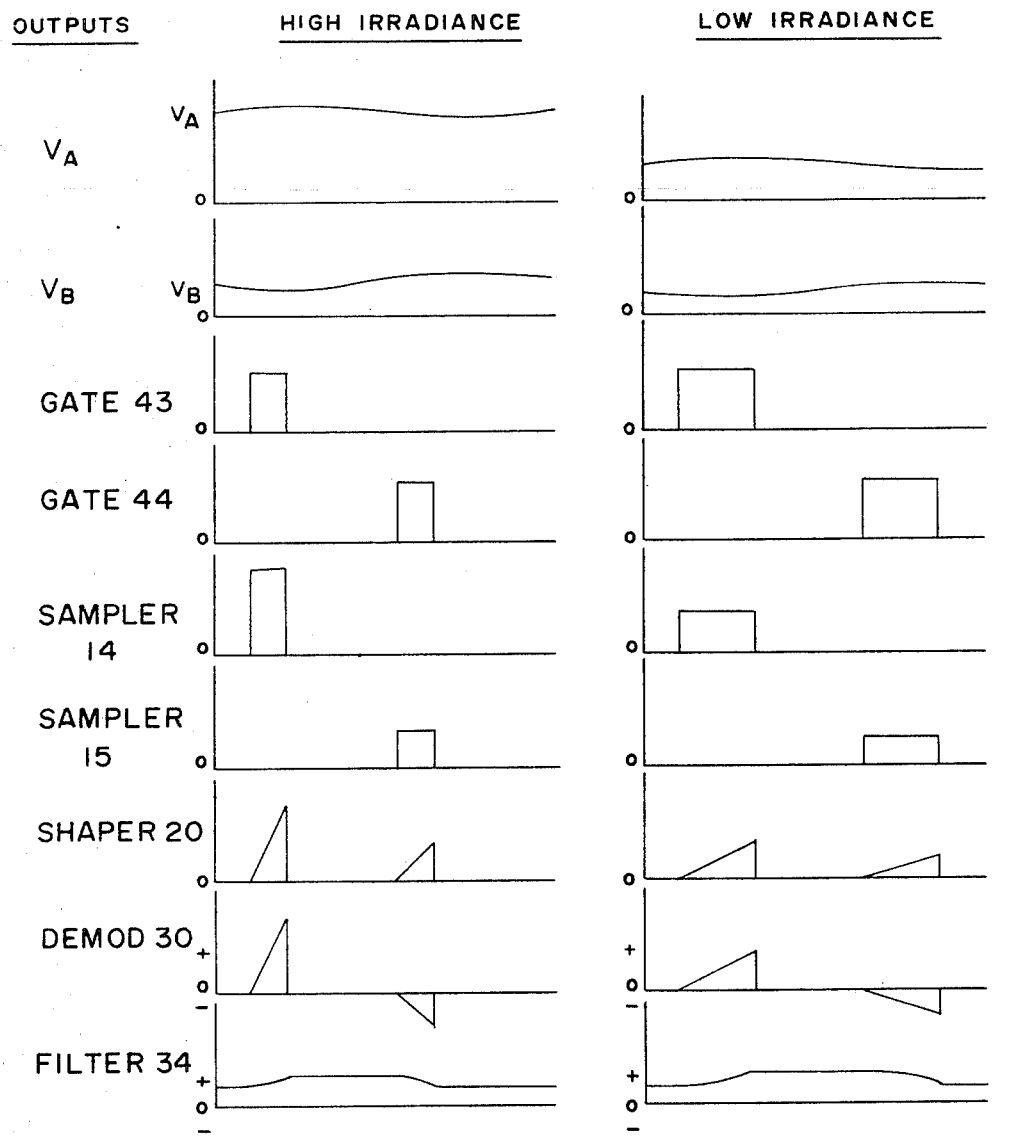
FIG. 3 is a multiline waveform diagram of samples and pulses useful in explaining the operation of the tracker shown in FIG. 1 for two different radiance levels.

Hereafter the invention will first be described in conjunction with a single axis electro-optical tracker for tracking a radiant source. The implementation first to be described employs sequential sampling of the detected signals. Simultaneous sampling employing parallel processing and different demodulators will be described thereafter. Two-axes tracking employing four detectors will also be described.

As will be appreciated the invention is not limited to the specific implementations described and referenced. This novel tracking concept may be employed to provide a signal which is a function of angle with respect to any type of emitter of non-constant radiant energy or any emitter whose angular subtense, from the tracker, is varying or non-homogeneous.

As seen from FIG. 1, in one embodiment the tracker includes two optical detectors A and B with their light sensitive areas adjacent to one another. In practice an image created by the radiant flux from the light source, which is being tracked, is imaged on the detectors. Deliberate defocussing may be employed to enlarge the image and extend the linear field-of-view. The spatial extent of the image, represented by arrow 10, is such that some energy falls on each of the detectors when the source is within the tracker's linear field-of-view.

The outputs of detectors A and B are supplied to detector load networks 12 and 13, respectively. Each of these networks provides an output voltage which is a function of the light detected by the detector to which it is connected. As shown, each of the two networks comprises a capacitor C and load resistor $R_L$. The relative values of the components of each of the networks may differ as required to accommodate detectors of differing sensitivity. The voltage across resistors $R_L$ of networks 12 and 13 are designated $V_A$ and $V_B$, respectively.

These voltages are successively sampled by samplers 14 and 15 which are activated by pulses from a network 18, whose mode of operation will be described hereafter in detail. Briefly, network 18 controls samplers 14 and 15 to sample $V_A$ and $V_B$ respectively, during two successive equal duration periods. The period is controlled as a function of the net irradiation of detectors A and B. The successive samples of the samplers 14 and 15 are shaped by a sample shaper 20.

In FIG. 1, the input to shaper 20 is represented by a succession of samples in the form of pulses. The succession or sequence is designated by numeral 22. Numerals 22a designate the samples from sampler 14 and numerals 22b designate the samples from sampler 15. The samples are shaped into a function which permits the maximization of the dynamic input range over which the tracker will function. In one embodiment, shaper 20 is an integrator thereby converting each rectangular sample of sequence 22 into a corresponding triangular sample. The output sample sequence of shaper 20 is designated by 22S and each sample therein is designated by its corresponding input sample followed by the letter S.

The output sample 22S is then amplified by an amplifier 25 whose output drives a demodulator 30. Basically, demodulator 30 is a synchronous detector which produces an output which is proportional to the difference between the two samples corresponding to a detector pair such as samples 22as and 22bs. Herein, difference is defined as the difference of the time-voltage integral of the two samples. The output of demodulator 30 is designated by the sample sequence 32.

Alternately viewed, the demodulator 30 provides an output in which the polarity of the samples 22bs are inverted in polarity compared with the samples 22as. The output of demodulator 30 is amplified and filtered by a lowpass filter 34, which removes the frequencies which are generated by the preceding sampling operation, leaving only the components which carry the tracking error information. The tracking error is a DC signal whose amplitude depends on the difference between successive pairs of the demodulator's output samples, which, as is appreciated, are related to the irradiance difference on detectors A and B respectively. The polarity of the error signal depends on which of the samples is greater.

In FIG. 1, it is assumed that the irradiance of detector A is greater than that of B. Therefore, samples 22as are greater than samples 22bs and consequently the output error signal has a plus (+) polarity. The output error signal with respect to a reference potential, such as ground (0 volt), is designated by numeral 35.

As seen from FIG. 1, the output of amplifier 25 is also supplied to an automatic gain control (AGC) demodulator 40. This demodulator produces a voltage which is proportional to the average of the time-voltage integral products, represented by the areas of the samples in sequence 22S. This output voltage will be referred to as the AGC voltage. It is supplied to a pulse width modulator 42 which forms part of the network 18. Briefly, modulator 42 controls the sampling period of samplers 14 and 15. Demodulator 40 is synchronously clocked from the pulse width modulator. Demodulation thus occurs only during the detector signal sampling periods.

Network 18 includes a pair of AND gates 43 and 44 and a divide-by-two circuit 45. The latter, as well as modulator 42 are provided with clock pulses 46 from an appropriate clock (not shown). The divider 45 operates to divide the clock frequency by two. This new frequency is provided to gate 43. It's inverse is provided to gate 44. The effect is to enable each of the gates during successive clock periods. Stated otherwise, successive gating pulses are supplied alternately to the two AND gates. Each clock pulse also activates modulator 42 to supply an enabling pulse to the two gates. The time duration or width of the enabling pulse is a function of the AGC voltage.

It is thus seen that the samplers 14 and 15 are activated successively, rather than simultaneously, during successive clock pulse periods. However, the sampling period is controlled by the width of the enabling pulse from modulator 42 which is controlled by the AGC voltage. In one particular embodiment the characteristic of the modulator is chosen as illustrated in FIG. 2. It is thus seen that the modulator provides a constant width pulse, which in this embodiment equal one-half the clock pulse period, until the AGC voltage reaches a threshold. As the AGC voltage starts to exceed the threshold, the pulse width starts to decrease in accordance with a predetermined function, such as exponentially, as shown in fig. 2. As the irradiance level increases the AGC voltage increases and when it exceeds its threshold it causes the sampling period to decrease. Conversely, low irradiance levels cause the AGC voltage to drop below its threshold and thereby increase the sampling period to its maximum value. A constant AGC voltage implies that the net "area" of the samples is constant thereby eliminating the effects of varying input irradiance levels.

The operation of the novel tracker of the present invention may best be summarized in conjunction with FIG. 3 wherein the outputs of the various circuits herebefore described are shown for high and low irradiance levels. As is appreciated from the foregoing description at a high irradiance level the sampling period as represented by the outputs of gates 43 and 44 is shortened, as compared with the sampling period during a low irradiance level. Thus the differential "area" of any pair of samples is a function only of the relative proportioning of the irradiance between the two detectors and not a function of the total magnitude or level of the irradiance.

Figure 4:
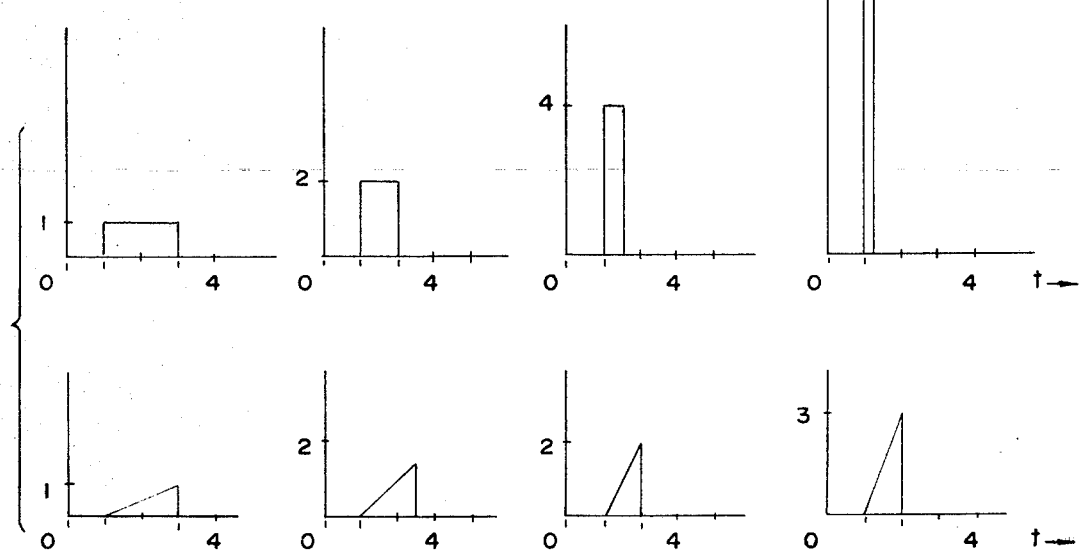
FIG. 4 is a diagram useful in explaining the advantages of shaping square samples into triangular pulses.

As previously stated, the rectangular samples from samplers 14 and 15 are shaped by shaper 20 into triangular samples, which are then amplified to drive demodulator 40 which produces the AGC voltage as a function of the time integral of all the samples. Such sample shaping permits gain control over a wide dynamic range of inputs. It avoids saturation of the amplifier 25 and the demodulators. Saturation of these circuits would restrict the tracker's dynamic range if rectangular samples were processed. This aspect is best highlighted in FIG. 4 wherein sample modulation for successive doubling of input irradiance is diagrammed in terms of rectangular samples and their corresponding triangular samples. All successive samples are of equal area.

As is known, the area of a triangle varies as the square of its base dimension while that of a rectangle varies as a linear function of its base dimension. Thus it is seen that the use of the triangular samples increases the dynamic range of the AGC by delaying saturation of the amplifier and demodulators. This is true since the peaks of the triangular samples are lower than those of their corresponding rectangular samples.

Although triangular samples have been described it is believed that samples with exponentially increasing voltages would further increase the effective dynamic range of the tracker. This could be accomplished by double integration of the original rectangular sample pulse. However, this is at the cost of increased complexity of the shaper 20.

Although herebefore the invention has been described in connection with a sequential sampling scheme it is not limited thereto. Parallel simultaneous sampling can also be employed by providing a separate amplifier for each additional channel and using a different type of demodulator for demodulator 30. A simple block diagram for parallel simultaneous sampling is shown in FIG. 5 wherein elements like those shown in FIG. 1 are designated by like numerals. As seen in FIG. 5, the output samples of sampler 15 are shaped by a shaper 20a which is identical with shaper 20 herebefore described. The output of shaper 20a which consists of triangular pulses are amplified by amplifier 25a, whose output together with that of amplifier 25 are supplied to demodulator 40. The latter generates the AGC voltage as a function of the sum of the time interval of the triangular pulses from both amplifiers. The outputs of the amplifiers 25 and 25a are supplied to demodulators 30a and 30b respectively. These provide the time voltage integrals or products of the triangular samples of the two amplifiers. The outputs of the two demodulators are subtracted by subtractor 34a whose output represents the tracking error signal. Thus, herein demodulators 30a and 30b and subtractor 34a perform the functions performed by demodulator 30 and filter 34 shown in FIG. 1.

Figure 6:
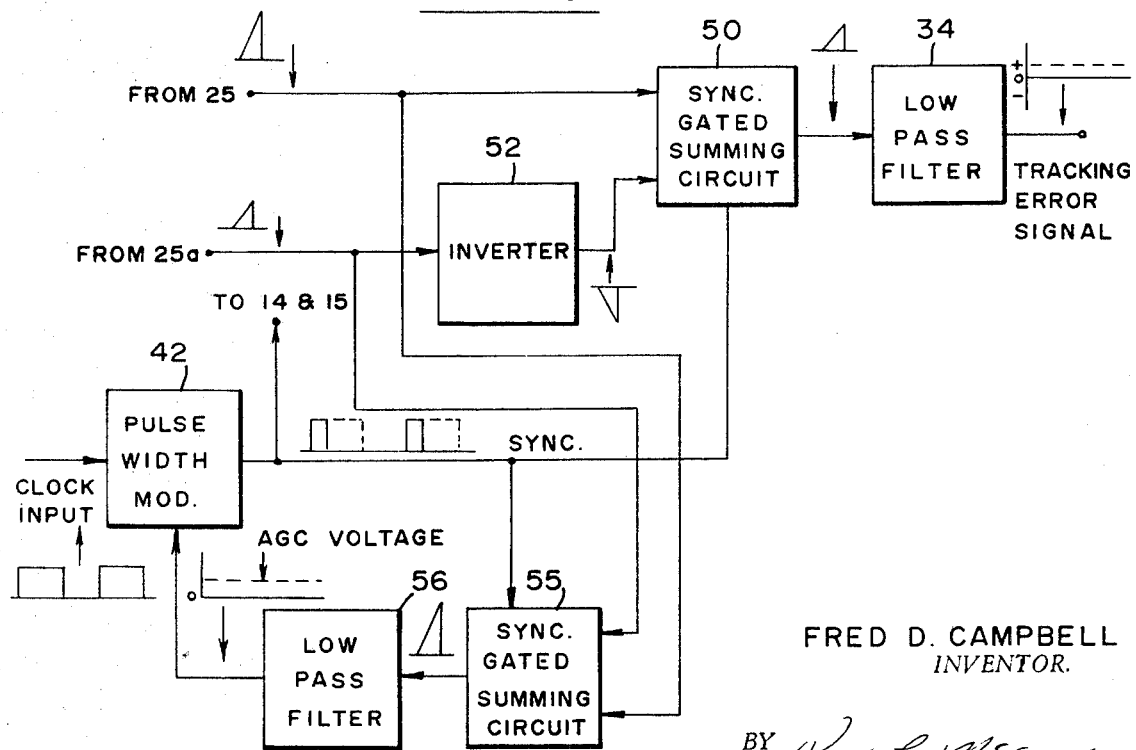
FIG. 6 is a partial diagram of another embodiment.

As shown in FIG. 6, the demodulators 30a and 30b and subtractor 34a may be replaced by a synchronously gated summing circuit 50, an inverter 52 and a lowpass filter, such as filter 34. Also demodulator 40 may be replaced by a synchronously gated summing circuit 55 and a lowpass filter 56. Both circuits 50 and 55 are gated by the variable-time pulses from the pulse width demodulator 42. The aforedescribed embodiments are applicable for single-axis tracking. If desired the teachings may be employed for two-axes tracking.

Figure 7:
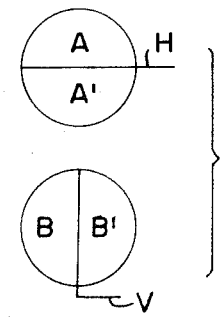
FIG. 7 is a matrix detector diagram for two-axes tracking.

In such an application four detectors may be employed as shown in FIG. 7. Therein, detectors A and A' are arranged to provide tracking about the horizontal axis H and detectors B and B' are used to provide tracking about the vertical axis V. The irradiance or illumination is assumed to be directed to each pair of the detectors by means of a beam splitter (not shown). Each pair of detectors is associated with separate circuitry as herebefore described.

Another application involves the employment of the principles of the invention in conjunction with a "4-quadrant" detector in a two-axis tracker.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A source-of-energy tracker comprising:
   first and second energy detectors for converting energy received from said source about a first axis to first and second outputs respectively as a function of the received energy;
   sampling means for sampling said first and second outputs to provide samples of said outputs;
   output means responsive to said samples for providing an output signal which is a function of the relationship between pairs of samples, each pair including one sample of said first output and a second sample of said second output; and
   control means responsive to said samples for controlling the duration of each sampling of said first and second outputs as a function of said samples.

2. The arrangement as recited in claim 1 wherein said output means include means for providing said output signal as a function of the difference of the time-voltage characteristics of each pair of samples, and said control means include demodulator means for providing a control signal whose amplitude is a function of the sum of time-voltage characteristics of samples of said first and second outputs.

3. The arrangement as recited in claim 2 wherein said sampling means includes means for providing said rectangularly shaped samples of said first and second outputs of durations controlled by said control means and shaping means responsive for converting said rectangularly shaped samples to samples of lower amplitudes but equal time-voltage properties.

4. The arrangement as recited in claim 3 wherein said shaping means convert said rectangularly shaped samples into triangularly shaped samples of corresponding equal areas.

5. The arrangement as recited in claim 1 wherein said control means include means for controlling said sampling means to successively sample said first and second outputs during two successive equal duration periods, the durations of said periods being a function of said samples to which said control means is responsive.

6. The arrangement as recited in claim 5 wherein said sampling means include means for combining said samples of said first and second outputs into a sequence of samples, with alternate samples in said sequence being from the same output and said output means include means for providing said output signal as a function of the difference between each pair of successive samples in said sequence, and said control means being responsive to said sequence, and said control means being responsive to said sequence of samples for providing a control signal whose amplitude is a function of said samples in said sequence, and pulse width means responsive to said control signal for controlling the sampling duration as a function thereof.

7. The arrangement as recited in claim 6 wherein each output is a direct-current (DC) voltage and said output means include means for providing a difference between each pair of two successive voltage samples as a function of the time-voltage characteristics thereof, and said control means include demodulator means for integrating said samples in said sequence to provide said control signal, with an amplitude which is a function of the integrated samples.

8. The arrangement as recited in claim 7 wherein said sampling means include shaping means for shaping each of said samples in said sequence.

9. The arrangement as recited in claim 8 wherein each output sample is of substantially constant amplitude during the entire duration thereof and said shaping means include means for integrating each constant amplitude sample.

10. The arrangement as recited in claim 9 wherein said demodulator means integrate said samples to provide an output voltage which is a function of the time-voltage integral of said samples, said pulse width means being responsive to said output voltage for controlling said sampling duration.

11. A tracker for tracking a source of energy and for providing a tracking error signal which is a function of the angle of incidence of the energy from said source, comprising;
first and second energy detectors for converting energy received from said source to first and second signals whose amplitudes are related to the energy detected by said first and second detectors, respectively;
sampling means for providing a sequence of samples of said first and second signals, alternate samples in said sequence being of the sample signal;
output means responsive to said succession of samples for providing an error signal whose amplitude is a function of the time-amplitude difference of a pair of adjacent samples in said sequence; and
control means responsive to said succession of samples for controlling the durations of the samples provided by said sampling means.

12. The arrangement as recited in claim 11 wherein said control means include a demodulator means for providing a control signal whose amplitude is a function of the time integral of the samples in said sequence, and means responsive to a succession of clock pulses and to said control signal for controlling said sampling means to sample said first and second signals during appropriate pulse periods respectively, the sampling period being a function of the amplitude of said control signal.

13. The arrangement as recited in claim 12 further including means for shaping the samples in said sequence, into corresponding samples of equal areas and lower amplitudes.

14. The arrangement as recited in claim 12 wherein said sampling means comprises first and second samplers for sampling said first and second signals respectively during periods controlled by said control means, means for combining the samples from said first and second samplers, said control means including means for controlling the sampling periods of said samplers.

15. The arrangement as recited in claim 14 further including means for shaping the samples in said sequence, into corresponding samples with more constant time bases.

* * * * *